(12) United States Patent
Matsuzawa

(10) Patent No.: US 11,804,244 B2
(45) Date of Patent: Oct. 31, 2023

(54) MAGNETIC DISK DEVICE AND FILTER COEFFICIENT SETTING METHOD OF THE MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuji Matsuzawa, Kashiwa Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/395,828

(22) Filed: Aug. 6, 2021

(65) Prior Publication Data

US 2022/0084552 A1 Mar. 17, 2022

(30) Foreign Application Priority Data

Aug. 7, 2020 (JP) .................. 2020-134808
Jan. 18, 2021 (JP) .................. 2021-005825
Aug. 5, 2021 (JP) .................. 2021-129160

(51) Int. Cl.
*G11B 19/20* (2006.01)
(52) U.S. Cl.
CPC .................. *G11B 19/20* (2013.01)
(58) Field of Classification Search
None
See application file for complete search history.

(56) References Cited

U.S. PATENT DOCUMENTS

| | | | |
|---|---|---|---|
| 6,636,376 B1 | 10/2003 | Ho | |
| 7,054,094 B2 | 5/2006 | Zhang et al. | |
| 7,283,321 B1* | 10/2007 | Sun | G11B 5/5552 |
| 7,372,659 B2 | 5/2008 | Takaishi | |
| 7,535,192 B2 | 5/2009 | Takaishi | |
| 7,564,644 B2 | 7/2009 | Kim et al. | |
| 8,503,124 B2 | 8/2013 | Uchida et al. | |
| 9,269,386 B1* | 2/2016 | Xi | G11B 5/59622 |
| 9,472,236 B1* | 10/2016 | Bui | G11B 20/10046 |
| 9,536,553 B1* | 1/2017 | Seo | G11B 5/5582 |
| 10,497,385 B1 | 12/2019 | Matsuzawa et al. | |

(Continued)

FOREIGN PATENT DOCUMENTS

| | | | | |
|---|---|---|---|---|
| JP | 2000048509 A | * | 2/2000 | G11B 21/106 |
| JP | 2004127410 A | * | 4/2004 | |

(Continued)

*Primary Examiner* — William J Klimowicz
(74) *Attorney, Agent, or Firm* — Allen & Overy LLP

(57) ABSTRACT

According to one embodiment, a magnetic disk device includes a controlled object, a controller which controls a motion of the controlled object, and loop shaping filters each connected in parallel to the controller. During a determination of coefficients of the loop shaping filters using a transfer function from outputs of the loop shaping filters to before an input of a disturbance affecting the controlled object, the first set of coefficients of each the loop shaping filter is determined by reflecting a frequency response of the other loop shaping filters, and the determined first sets of coefficients of the loop shaping filters are set to the loop shaping filters, respectively.

10 Claims, 6 Drawing Sheets

(56) References Cited

U.S. PATENT DOCUMENTS

| | | | | |
|---|---|---|---|---|
| 11,094,341 | B1* | 8/2021 | Matsuzawa | G11B 5/012 |
| 2006/0091963 | A1* | 5/2006 | Menkhoff | G05B 11/42 |
| | | | | 331/16 |
| 2006/0114601 | A1* | 6/2006 | Semba | G11B 5/5547 |
| | | | | 360/78.09 |
| 2009/0195914 | A1* | 8/2009 | Suh | G11B 5/596 |
| | | | | 360/75 |
| 2011/0069411 | A1* | 3/2011 | Uchida | G11B 19/042 |
| 2011/0102934 | A1* | 5/2011 | Bui | G11B 5/00813 |
| | | | | 369/53.28 |
| 2013/0170582 | A1* | 7/2013 | Rosendahl | H03H 17/0294 |
| | | | | 375/295 |
| 2016/0064021 | A1* | 3/2016 | Matsuzawa | G11B 5/59622 |
| | | | | 360/75 |
| 2019/0272850 | A1* | 9/2019 | Sudo | G11B 5/5547 |
| 2020/0395043 | A1* | 12/2020 | Matsuzawa | G11B 5/4873 |
| 2021/0294281 | A1* | 9/2021 | Nakagawa | G05B 13/024 |

FOREIGN PATENT DOCUMENTS

| | | | | |
|---|---|---|---|---|
| JP | 2007200463 A | * | 8/2007 | |
| JP | 2013084331 A | * | 5/2013 | G11B 5/59622 |
| KR | 100675003 B1 | * | 1/2007 | G11B 19/2009 |
| WO | WO-9613898 A1 | * | 5/1996 | H03H 11/04 |

\* cited by examiner

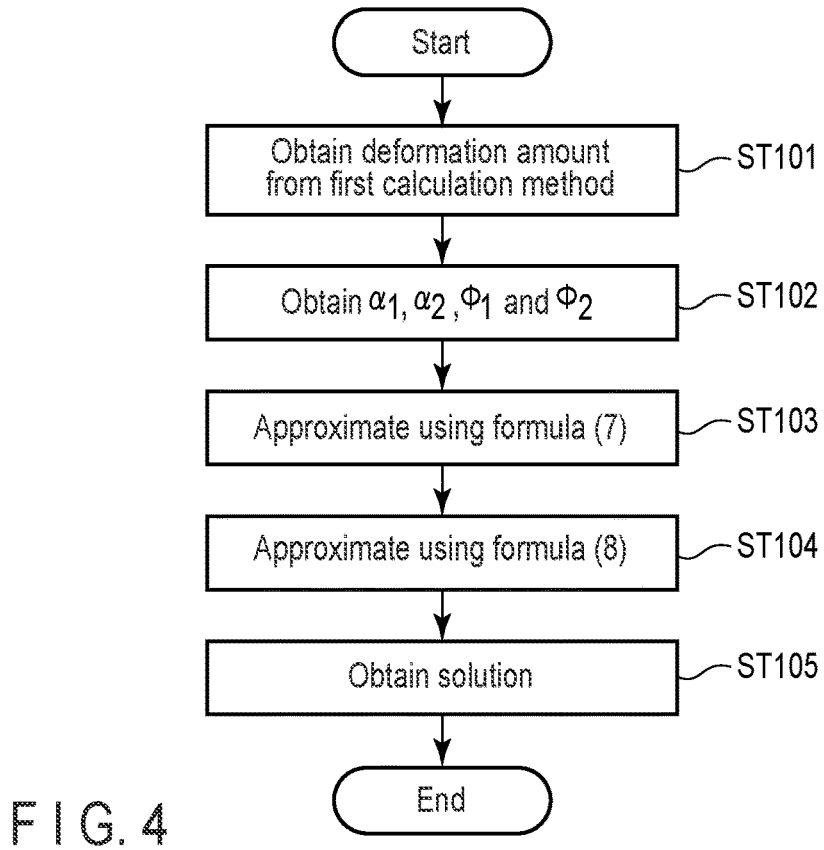
F I G. 4
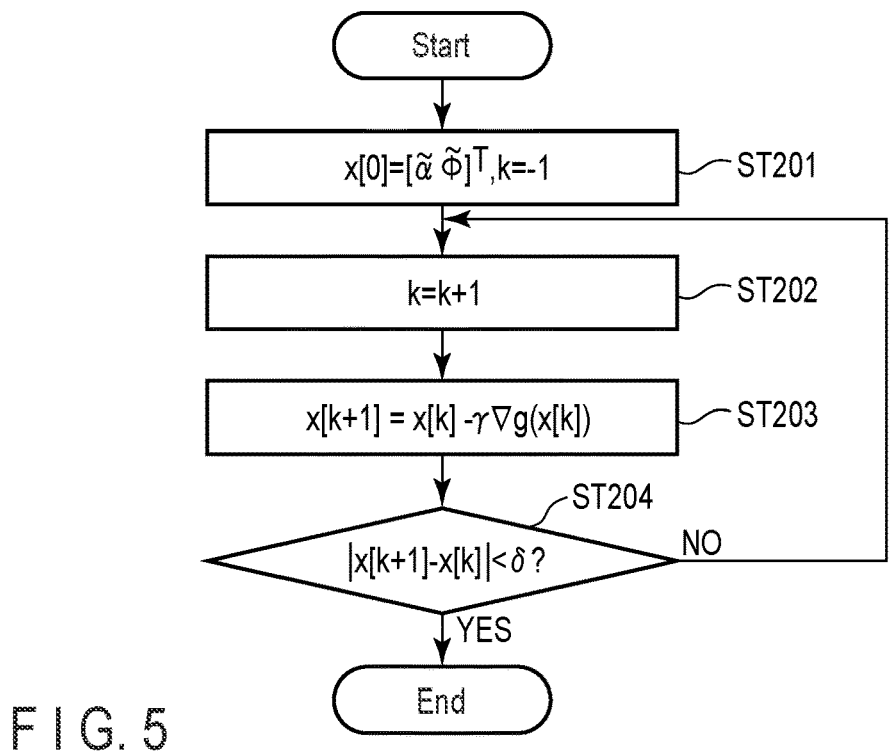
F I G. 5

MAGNETIC DISK DEVICE AND FILTER COEFFICIENT SETTING METHOD OF THE MAGNETIC DISK DEVICE

CROSS-REFERENCE TO RELATED APPLICATIONS

This application is based upon and claims the benefit of priority from Japanese Patent Applications No. 2020-134808, filed Aug. 7, 2020; No. 2021-005825, filed Jan. 18, 2021; and No. 2021-129160, filed Aug. 5, 2021, the entire contents of all of which are incorporated herein by reference.

FIELD

Embodiments described herein relate generally to a magnetic disk device and a filter coefficient setting method of the magnetic disk device.

BACKGROUND

In a magnetic disk device, in order to improve the positioning accuracy of a magnetic head with respect to a magnetic disk, it is necessary to suppress a vibration, etc., (a disturbance) caused by a fan of a server rack.

Meanwhile, as one of technologies for suppressing a disturbance, a technology of adding a loop shaping filter that suppresses an NRRO (Non-repeatable runout) disturbance to a normal feedback system is known. Here, when a plurality of loop shaping filters are added so deal with NRRO disturbances of plurality of vibration frequencies, the loop shaping filters mutually interfere with each other, and the positioning accuracy of a magnetic head does not improve.

Embodiments aim to provide a magnetic disk device and a filter coefficient setting method of the magnetic disk device capable of suppressing disturbances of a plurality of vibration frequencies and improving the positioning accuracy of a magnetic head.

BRIEF DESCRIPTION OF THE DRAWINGS

FIG. 4 is a flowchart showing an example of the main flow of a filter coefficient setting process according to the embodiment.

FIG. 5 is a flowchart showing an example of a parameter update process according to the embodiment.

DETAILED DESCRIPTION

Figure 1:
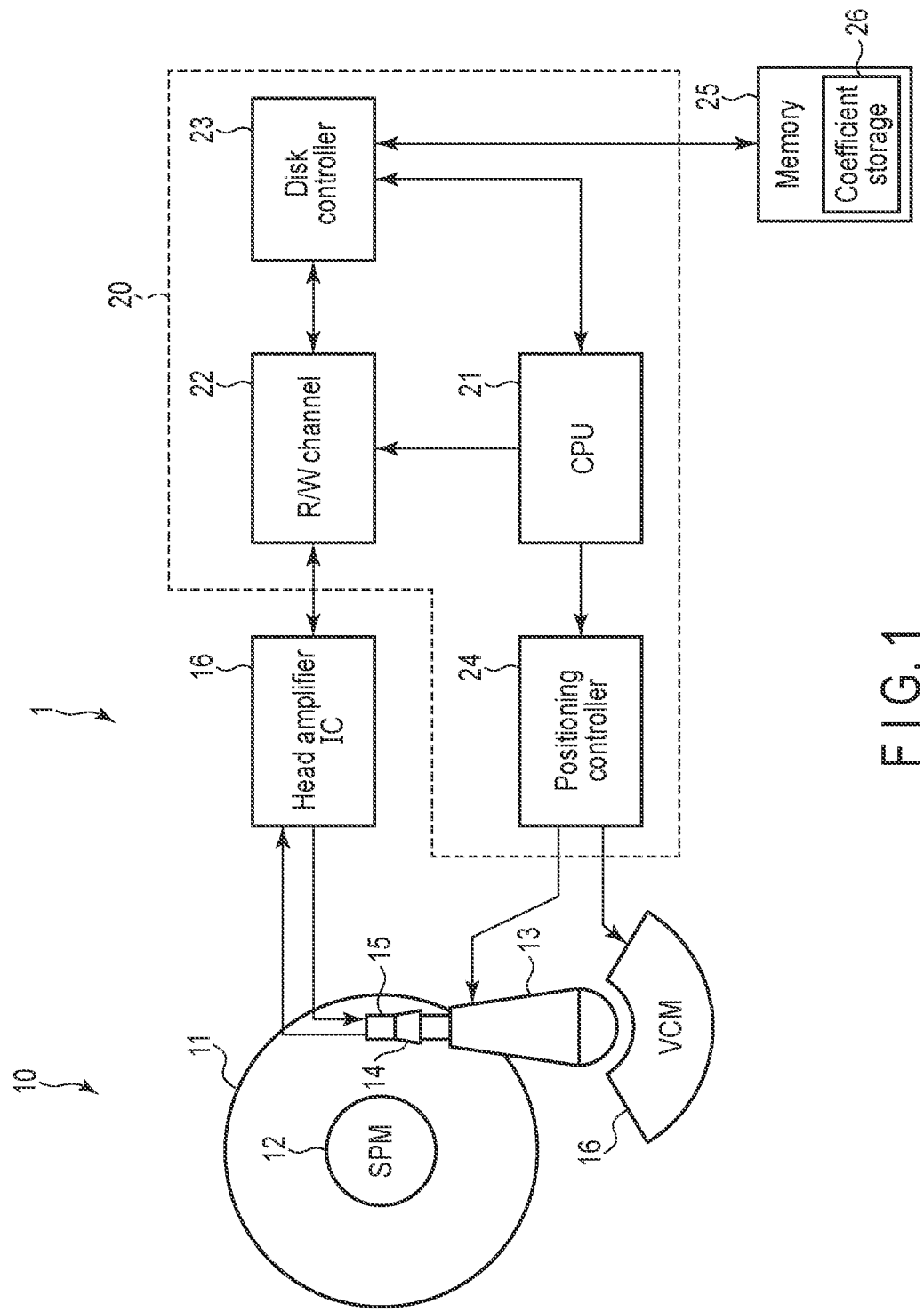
FIG. 1 is a block diagram showing an example of the configuration of a magnetic disk device according to an embodiment.

In general, according to one embodiment, there is provided a magnetic disk device comprising a controlled object, a controller which controls a motion of the controlled object, and a plurality of loop shaping filters each connected in parallel to the controller. During a determination of coefficients of the loop shaping filters using a transfer function from outputs of the loop shaping filters to before an input of a disturbance affecting the controlled object, a set of coefficients of each the loop shaping filter is determined by reflecting a frequency response of the other loop shaping filters, and the determined sets of coefficients of the loon shaping filters are set to each the loop shaping filter, respectively.

Embodiments will he described hereinafter with reference to the accompanying drawings. It should be noted chat the disclosure is merely an example, and the invention is not limited by the contents described in the following embodiments. Modifications which are easily conceivable by a person of ordinary skill in the art come within the scope of the disclosure as a matter of course. In the drawings, in order to make the description clearer, the sizes, shapes and the like of the respective parts may be illustrated schematically with changes to the actual embodiment. In the drawings, the corresponding elements may be denoted by the same reference numbers, and the detailed descriptions thereof may be omitted.

First Embodiment

FIG. 1 is a block diagram showing an example of the configuration of a magnetic disk device 1.

The magnetic disk device 1 is composed of a head-disk assembly (HDA) 10, a head amplifier integrated circuit (hereinafter referred to as a head amplifier IC) 16, and a system on a chip (SOC) 20.

The HDA 10 has a magnetic disk 11, a spindle motor (SPM) 12, an arm 13, and a voice coil motor (VCM) 16. The magnetic disk 11 is rotated by the SPM 12. A load beam 14 is mounted on the tip of the arm 13, and a magnetic head 15 is mounted on the tip of the load beam 14. The arm 13 is driven by the VCM 16, and moves/controls the magnetic head 15 to a designated position on the magnetic disk 11.

The magnetic head 15 is structured such that a read head element and a write head element are mounted separately on one slider. The read head element reads data recorded on the magnetic disk 11. The write head element writes data to the magnetic disk 11.

The head amplifier IC 16 has a read amplifier and a write driver. The read amplifier amplifies a read signal read by the read head element, and transmits it to the read/write (R/W) channel 22. On the other hand, the write driver transmits a write current corresponding to write data output from the R/W channel 22 to the write head element.

The SOC 20 includes a microprocessor (CPU) 21, the R/W channel 22, a disk controller 23 and a positioning controller 24. The CPU 21 is the main controller of the drive, and executes servo control for positioning the magnetic head 15 via the positioning controller 24 and data read/write control via the head amplifier IC 16. The R/W channel 22 includes a read channel for executing signal processing of read data, and a write channel for executing processing of write data. The disk controller 23 executes interface control for controlling data transfer between a host system (not shown) and the R/W channel 22. It should be noted that the positioning controller 24 may be realized as hardware or may be realized as software (firmware).

A memory 25 includes a volatile memory and a nonvolatile memory. For example, the memory 25 includes a buffer memory of DRAM, and a flash memory. The nonvolatile memory of the memory 25 has a storage (illustration omitted) which stores a program, etc., necessary for the processing of the CPU 21, and a coefficient storage 26 which stores filter coefficients when a filter coefficient setting process which will be described later is executed. The filter coefficient stored in the coefficient storage 26 will be described later. It should be noted that the coefficient storage 26 is not necessarily stored in the memory 25 but may be stored in any storage region in the magnetic disk device 1.

Here, a technology related to a filter which suppresses an NRRO disturbance (hereinafter referred to simply as a filter) will be described with reference to FIG. 2.

Figure 2:
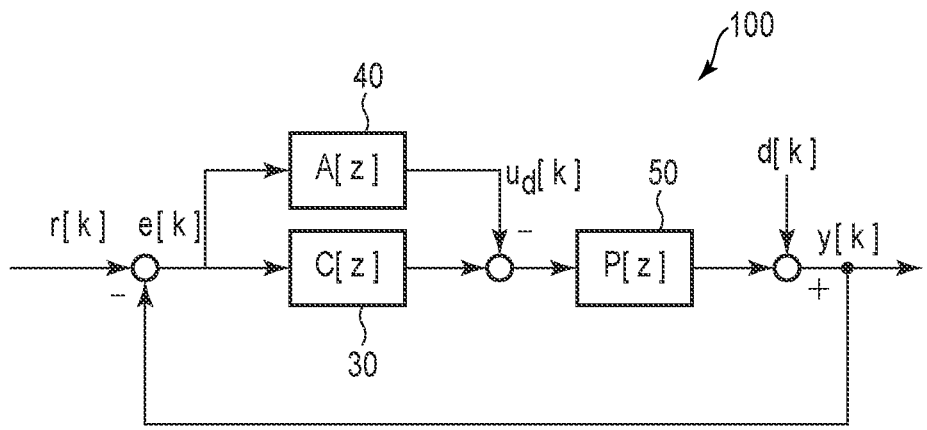
FIG. 2 is an illustration showing an example of a control system which suppresses a disturbance according to the embodiment.

FIG. 2 is an illustration showing an example of a control system which suppresses a disturbance. As shown in FIG. 2, a filter A[z] 40 is arranged parallel to a controller C[z] 30, and the combined output is input to a controlled object P[z] 50, and the controlled object P[z] 50 is operated. By operating the controlled object P[z] 50 by reflecting the output of the filter A[z] 40 as described above, control is executed so that the effect of a disturbance d[k] is canceled. In the magnetic disk device 1 of the present embodiment, the controller C[z] 30 and the filter A[z] 40 are included in the positioning controller 24, and the controlled object P[z] 50 corresponds to the VCM 16. If the magnetic disk device is a type in which a microactuator operating the write element and the read element minutely is mounted on the magnetic head, not only the VCM 16 but also the microactuator may be included in the controlled object.

The following formula (1) is used as the filter A[z] 40.

$$A[z] = \frac{\mu}{\alpha} \frac{z^2 \cos\phi - \eta z \cos(\omega_0 T + \phi)}{z^2 - 2\eta z \cos\omega_0 T + \eta^2} \quad (1)$$

where T is a sampling period, and $\eta$ and $\mu$ are design parameters.

In addition, $\alpha$ and $\varphi$ in the coefficients of the filter A[z] 40 are expressed by the following formulas (2).

$$M_{u_dd}[z] := \frac{P[z]}{1 + P[z]C[z]} \quad \alpha = |M_{u_dd}[e^{j\omega_0 T}]|, \; \phi = \arg(M_{u_dd}[e^{j\omega_0 T}]) \quad (2)$$

where $\alpha$ and $\varphi$ are parameters for matching a gain and a phase at a suppression target angular frequency $\omega 0$ of a transfer function Mudd[z] from a filter output ud[k] to before an input of a disturbance d[k] of FIG. 2. This means that the filter is designed in consideration of a change in gain and phase occurring until the signal ud[k] output from the filter A[z] 40 reaches a position where the disturbance d[k] is input so that an estimate value for suppressing the disturbance d[k] estimated from a position error signal by the filter A[z] 40 cancels the disturbance d[z].

Figure 3:
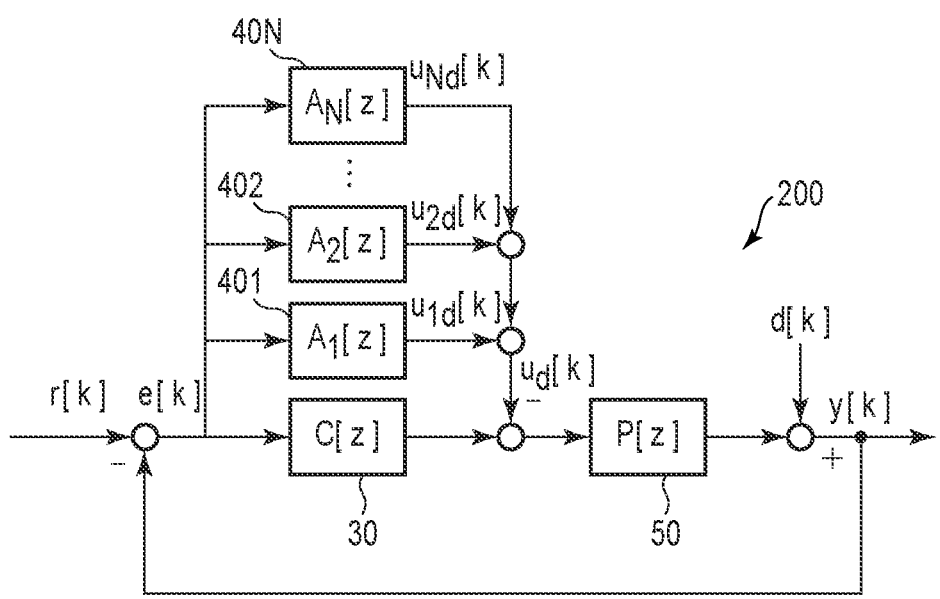
FIG. 3 is an illustration showing an example of a configuration in which a plurality of stages of filter are disposed in the control system according to the embodiment.

FIG. 3 is an illustration showing an example of a control system 200 in which a plurality of stages of this filter are arranged. The details of the control system 200 will be described later.

In this case, the filter or the following formula (3) as used.

$$A_i[z] := \frac{\mu_i}{\alpha_i} \frac{z^2 \cos\phi_i - \eta_i z \cos(\omega_i T + \phi_i)}{z^2 - 2\eta_i z \cos\omega_i T + \eta_i^2}, \; i = 1, \ldots, N \quad (3)$$

$$\alpha_i = |M_{u_dd}[e^{j\omega_i T}]|, \; \phi_i = \arg(M_{u_dd}[e^{j\omega_i T}])$$

However, in the configuration of the control system 200 shown in FIG. 3, when a plurality of stages of filter A1[z] to AN[z] designed based on formula (3) so that only the filter Ai[z] corresponding to the target angular frequency ωi satisfies a gain specification of the sensitivity function at the target angular frequency ωi are simply added, a change in the matching gain and phase under the effect of the other filters is not considered, and an NRRO disturbance cannot be suppressed as intended.

Therefore, in the following embodiment, when a plurality or stages of filter are disposed in the control system 200 of the controlled object P[z] 50 (the VCM 16 in the magnetic disk device 1), the effect of each filer on the matching of the gain and the phase of the other filters (the frequency response of the filter) is considered so that the magnetic disk device 1 executes appropriate control for a plurality of disturbances, suppresses disturbances as intended by the designer, and improves the positioning accuracy of the magnetic head 15. The method will be described below.

First, the configuration of the control system 200 comprising the stages of filter will be described in detail.

FIG. 3 is an illustration showing an example of the configuration of the control system 200 comprising the stages of filter. As shown in FIG. 3, the control system 200 is composed such that a plurality of filters A1[z] 401 to AN[z] 40N are arranged parallel to the controller C[z] 30, the combined output is input to the controlled object P[z] 50, and the controlled object P[z] 50 is operated. When the control system 200 is composed in this way, even if a plurality of disturbances occur, it is still possible to execute the positioning of the controlled object P[z] 50 accurately by setting different filter coefficients to the respective filters A[z] to cancel the effects of the respective disturbances.

In addition, FIG. 4 is a flowchart showing an example of the main flow of the filter coefficient setting process. The process of setting the filter coefficients to the filters A1[z] 401 to AN[z] 40N will be described with reference to FIG. 4. This process is executed by the CPU 21 based on the instruction of the host system, for example.

The configuration tor considering the effect of each of the filters A1[z] 401 to An[z] 40N on the matching of the gain and the phase of the other filters, more specifically, a transfer function Muidd[z] from a filter output uid[k] of each of the filters A1[z] 401 to An[z] 40N to before the input of the disturbance d[k] and matching αi and φi of the gain and the phase are set as the following formulas (4).

$$M_{u_{id}d}[z] := \frac{P[z]}{1 + P[z](C[z] + B[z] - A_i[z])}, \; B[z] := \sum_{i=1}^{N} A_i[z] \quad (4)$$

$$\alpha_i = |M_{u_{id}d}[e^{j\omega_i T}]|, \; \phi_i = \arg(M_{u_{id}d}[e^{j\omega_i T}])$$

Alternatively, αi and φi may be obtained such that a gain of the sensitivity function or a gain and phase of the sensitivity function at target angular frequency ωi when all the loop shaping filters A1[z] to AN[z] are disposed become the same as a gain and phase of the sensitivity function at target angular frequency ωi respectively when the filter Ai[z] designed based on formula (3) is disposed alone so that only the filter Ai[z] corresponding to the target angular frequency ωi satisfies the gain specification of the sensitivity function at the angular target angular frequency ωi.

An example of the method of obtaining αi and φi. expressed as the above formulas (4) will be described below using an example where the number of stages of filter A[z] is two.

First, the above formulas (4) are transformed to the following formulas (5). Accordingly, change amounts thereof from those obtained from the above formulas (1) to (3) can be obtained (ST101).

Note that it is assumed that fi:=exp(jωiT).

$$M_{u_{i}dd}[z] = M_{u_dd}[z] \frac{1}{1 + M_{u_dd}[z] \ (B[z] - A_i[z])} \quad (5)$$

$$\alpha_i = \tilde{\alpha}_i \Delta\alpha_i, \ \tilde{\alpha}_i = |M_{u_dd}[f_i]|, \ \Delta\alpha_i = \left|\frac{1}{1 + M_{u_dd}[f_i] \ (B[f_i] - A_i[f_i])}\right|$$

$$\phi_i = \tilde{\phi}_i - \Delta\phi_i, \ \tilde{\phi}_i = \arg(M_{u_dd}[f_i]),$$

$$\Delta\phi_i = \arg(1 + M_{u_dd}[f_i] \ (B[f_i] - A_i[f_i]))$$

When the number of stages of filter is two, as in the following formulas (6), what are obtained are α1, α2, φ1 and φ2 (ST102), and matching gain and phase which do not reflect the effect of another filter $\tilde{\alpha}_1, \tilde{\alpha}_2, \tilde{\phi}_1, \tilde{\phi}_2$ are known values.

$$A_1[z] = \frac{\mu_1}{\alpha_1} \frac{z^2 \cos\phi_1 - \eta_1 z \cos(\omega_1 T + \phi_1)}{z^2 - 2\eta_1 z \cos\omega_1 T + \eta_1^2}, \quad (6)$$

$$A_2[z] = \frac{\mu_2}{\alpha_2} \frac{z^2 \cos\phi_2 - \eta_2 z \cos(\omega_2 T + \phi_2)}{z^2 - 2\eta_2 z \cos\omega_2 T + \eta_2^2}$$

$$\alpha_1 = \tilde{\alpha}_1 \Delta\alpha_1, \ \alpha_2 = \tilde{\alpha}_2 \Delta\alpha_2, \ \phi_1 = \tilde{\phi}_1 - \Delta\phi_1, \ \phi_2 = \tilde{\phi}_2 - \Delta\phi_2$$

$$\Delta\alpha_1 := \left|\frac{1}{1 + M_{u_dd}[f_1]A_2[f_1]}\right|, \ \Delta\alpha_2 := \left|\frac{1}{1 + M_{u_dd}[f_2]A_1[f_2]}\right|$$

$$\Delta\phi_1 := \arg(1 + M_{u_dd}[f_1]A_2[f_1]),$$

$$\Delta\phi_2 := \arg(1 + M_{u_dd}[f_2]A_1[f_2])$$

Here, Mudd[f2]A1[f2] and mudd [f1]A2[f1] are approximated as the following formulas (7) (ST103).

$$M_{u_dd}[f_2]A_1[f_2] \simeq \frac{p_1[f_2] + q_1[f_2]\Delta\phi_1}{\Delta\alpha_1}, \quad (7)$$

$$M_{u_dd}[f_1]A_2[f_1] \simeq \frac{p_2[f_1] + q_2[f_1]\Delta\phi_2}{\Delta\alpha_2}$$

$$p_i[x] = M_{u_dd}[x] \frac{\mu_i}{\tilde{\alpha}_i} \frac{x^2 \cos\tilde{\phi}_i - \eta_i x \cos(\omega_i T + \tilde{\phi}_i)}{x^2 - 2\eta_i x \cos\omega_i T + \eta_i^2},$$

$$q_i[x] = M_{u_dd}[x] \frac{\mu_i}{\tilde{\alpha}_i} \frac{x^2 \sin\tilde{\phi}_i - \eta_i x \sin(\omega_i T + \tilde{\phi}_i)}{x^2 - 2\eta_i x \cos\omega_i T + \eta_i^2}$$

By using these, Δα1, Δα2, Δφ1 and Δφ2 can be approximated as the following formulas (8), and Δα1, Δα2, Δφ1 and Δφ2 can thereby be obtained (ST104).

$$\Delta\alpha_1 \simeq |p_2[f_1]|^{-1} \quad (8)$$

$$(-|p_2[f_1]|^{-2}\Re(p_2[f_1])\Delta\alpha_2 - |p_2[f_1]|^{-2}\Re(p_2[f_1]\overline{q_2[f_1]})\Delta\phi_2 + 1)\Delta\alpha_2$$

$$\Delta\alpha_2 \simeq |p_1[f_2]|^{-1}$$

$$(-|p_1[f_2]|^{-2}\Re(p_1[f_2])\Delta\alpha_1 - |p_1[f_2]|^{-2}\Re(p_1[f_2]\overline{q_1[f_2]})\Delta\phi_1 + 1)\Delta\alpha_1$$

$$\Delta\phi_1 \simeq -\frac{\Im(p_2[f_1])}{\Re(p_2[f_1])^2}\Delta\alpha_2 +$$

$$\frac{\Re(p_2[f_1])\Im(q_2[f_1]) - \Im(p_2[f_1])\Re(q_2[f_1])}{\Re(p_2[f_1])^2}\Delta\phi_2$$

$$\Delta\phi_2 \simeq -\frac{\Im(p_1[f_2])}{\Re(p_1[f_2])^2}\Delta\alpha_2 +$$

$$\frac{\Re(p_1[f_2])\Im(q_1[f_2]) - \Im(p_1[f_2])\Re(q_1[f_2])}{\Re(p_1[f_2])^2}\Delta\phi_1$$

When these are rewritten to the following formulas (9), one solution becomes a formula (10) (ST105).

$$v = (m_1 w + m_2 y + m_3)w \quad (9)$$

$$w = (n_1 v + n_2 x + n_3)v$$

$$x = g_1 w + g_2 y$$

$$y = h_1 v + h_2 x$$

$$v = \sqrt[3]{-\frac{27\mu + 2\kappa^3 - 9\kappa\lambda}{54} + \sqrt{\left(\frac{27\mu + 2\kappa^3 - 9\kappa\lambda}{54}\right)^2 + \left(\frac{3\lambda - \kappa^2}{9}\right)^3}} + \quad (10)$$

$$\sqrt[3]{-\frac{27\mu + 2\kappa^3 - 9\kappa\lambda}{54} - \sqrt{\left(\frac{27\mu + 2\kappa^3 - 9\kappa\lambda}{54}\right)^2 + \left(\frac{3\lambda - \kappa^2}{9}\right)^3}} - \frac{1}{3}\kappa$$

$$w = R(Pv + n_3)v$$

$$y = Q(h_1 v + g_1 h_2 w)$$

$$x = (1 + g_2 h_2 Q)g_1 w + g_2 h_1 Q v$$

$$P := (n_1 + g_2 h_1 n_2 Q)$$

$$Q := (1 - g_2 h_2)^{-1}$$

$$R := [1 - n_2(1 + g_2 h_2 Q)g_1]^{-1}$$

$$\kappa := \frac{(m_1 + g_1 h_2 m_2 Q)Rn_3 + (m_1 n_3 R + h_1 m_2 Q + g_1 h_2 m_2 n_3 QR)}{(m_1 + g_1 h_2 m_2 Q)RP}$$

$$\lambda := \frac{m_3 RP + (m_1 n_3 R + h_1 m_2 Q + g_1 h_2 m_2 n_3 QR)Rn_3}{(m_1 + g_1 h_2 m_2 Q)R^2 P^2}$$

$$\mu := \frac{m_3 n_3 R - 1}{(m_1 + g_1 h_2 m_2 Q)R^2 P^2}$$

Also when two stages of filter, that is, the filters A1[z] and A2[z] are disposed in the control system 200, it is possible, by obtaining the solution as described above, to set the filter coefficients of the filters A1[z] and A2[z] to the coefficient storage 26 so that the filters A1[z] and A2[z] suppress the effects of different disturbances. Therefore, also when the filters A1[z] and A2[z] are disposed, the control system 200 of the magnetic disk device 1 can consider the output (effect) on the matching of the gain and the phase of another filter. Consequently, the magnetic disk device 1 can suppress NRRO disturbances as intended by the designer, and can improve the positioning accuracy of the controlled object P[z] 50.

Second Embodiment

In the second embodiment, Ai[z] and B[z] are expressed as functions of parameters as in the following formulas (11). The same configurations as those of the first embodiment are denoted by the same reference numbers.

Ai[z] and B[z] are set as the following formulas (11).

$$A_i[z, x_i] := \frac{\mu_i}{\alpha_i} \frac{z^2 \cos\phi_i - \eta_i z \cos(\omega_i T + \phi_i)}{z^2 - 2\eta_i z \cos\omega_i T + \eta_i^2}, \quad (11)$$

$$B[z, x] := \sum_{i=1}^{N} A_i[z, x_i]$$

$$x := [\alpha_1 \cdots \alpha_N \; \phi_1 \cdots \phi_N]^T, \; x_i := \begin{bmatrix} \alpha_i \\ \phi_i \end{bmatrix}, \; \tilde{x}_i := \begin{bmatrix} \tilde{\alpha}_i \\ \tilde{\phi}_i \end{bmatrix}$$

Then, the difference between the sensitivity function at each suppression target angular frequency ωi when a plurality of stages of filter are disposed, and the filter Ai[z] designed based on formula (3) is disposed alone so that only the filter Ai[z] corresponding to the target angular frequency ωi satisfies the gain specification of the sensitivity function at the target angular frequency ωi is set as an objective function. This objective function is the following formula (12).

$$g(x) := \sum_{i=1}^{N} |P[f_i]||B[f_i, x] - A_i[f_i, \tilde{x}_i]| \quad (12)$$

where parameters αi and φi which minimize the above formula (12) are obtained. For example, the parameters are updated until |x[k+1]−x[k]|<δ is satisfied in the following formula (13).

$$x[k+1] = x[k] - \gamma \nabla g(x[k]) \quad (13)$$

FIG. 5 is a flowchart showing an example of the parameter update process. This process is executed by the CPU 21 in the present embodiment.

As shown in FIG. 5, the CPU 21 assigns initial values to the parameters αi and φi, and sets a variable k to 1 (ST201). Next, the CPU 21 adds 1 to the variable k (ST202), calculates the formula (13) (ST203), determines whether the calculation result is less than δ or not (ST204), and repeats the process from step ST202 to step ST204 until the calculation result becomes less than δ.

Then, the CPU 21 obtains αi from the above formula (4) again using the approximate values of the converged. parameters αi and φi. It should be noted that ηi may be updated using the following formula (14).

$$\tilde{\mu}_i = \frac{\mu_i}{\tilde{\alpha}_i} \alpha i \quad (14)$$

Figure 6:
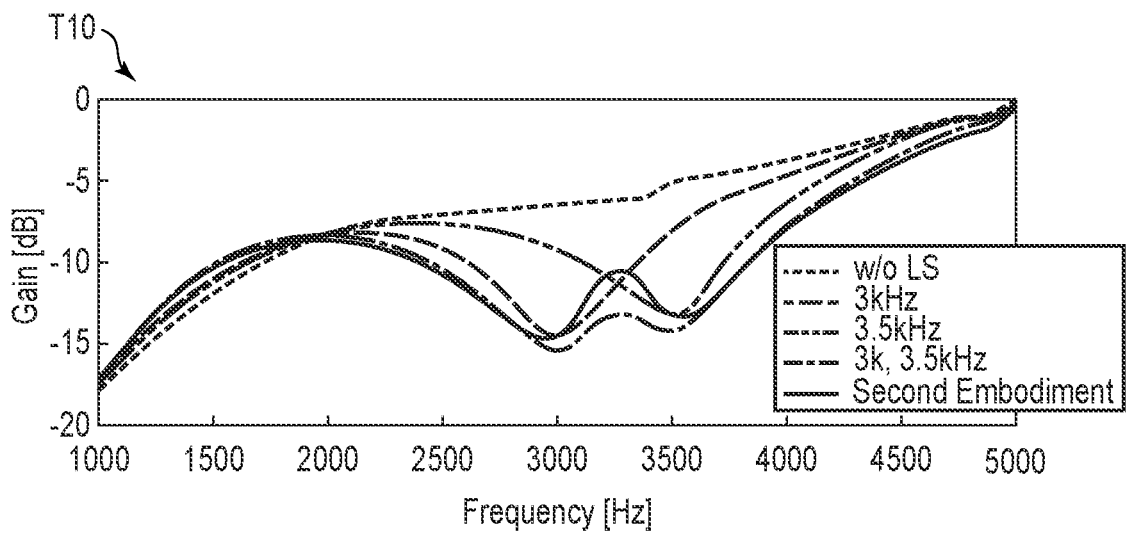
FIG. 6 is an illustration showing an example of the relationship of a gain to a frequency according to the embodiment.

FIG. 6 is an illustration showing an example of the relationship of the gain to the frequency. In addition, FIG. 6 shows a comparison among when no filter is used (w/o LS), when a filter of a frequency of 3 kHz is used, when a filter of a frequency of 3.5 kHz is used, when filters of frequencies of 3 kHz and 3.5 kHz are used, and when the second embodiment is applied. As shown in the graph when the second embodiment is applied, as compared with the graph when the filters of frequencies of 3 kHz and 3.5 kHz are used, the gain becomes as the designer intended.

Figure 7:
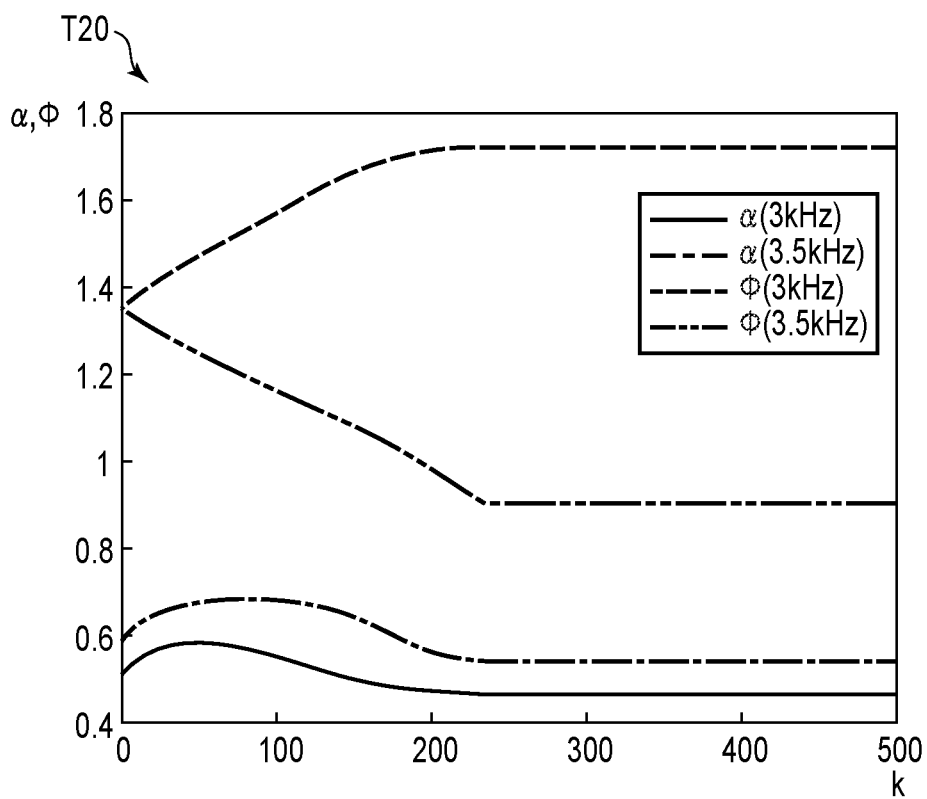
FIG. 7 is an illustration showing an example of the relationship of α and φ to a variable k according to the embodiment.

Furthermore, FIG. 7 is an illustration showing an example of the relationship of α and φ to the variable k. The vertical axis shows α (3 kHz, 3.5 kHz) and φ (3 kHz, 3.5 kHz), and the horizontal axis shows the variable k. As shown in FIG. 7, α (3 kHz, 3.5 kHz) and φ (3 kHz, 3.5 kHz) each are converged to a constant value as the variable k increases.

Also when the filter coefficients of the filter of the control system 200 are obtained as described above and the obtained filter coefficients are set to the coefficient storage 26, the same effects as those produced in the first embodiment can be produced.

In addition, when design parameters ui, ηi and ωi are adaptively determined, the value of the sensitivity function at each suppression target angular frequency ωi after the design parameters ui, ηi and ωi are adapted may be stored in the memory 25, and the approximate values of the parameters αi and φi may be obtained again to follow the procedure of the second embodiment.

Third Embodiment

The above-described embodiments do not deal with when the suppression target angular frequency ωi changes according to the environment. Therefore, an embodiment dealing with when the suppression target angular frequency ωi changes according to the environment will be described in the present third embodiment. The change according to the environment is, for example, a change in the disturbance, and the same configurations as those of the above-described embodiments will be denoted by the same reference numbers, and detailed descriptions thereof will be omitted.

Figure 8:
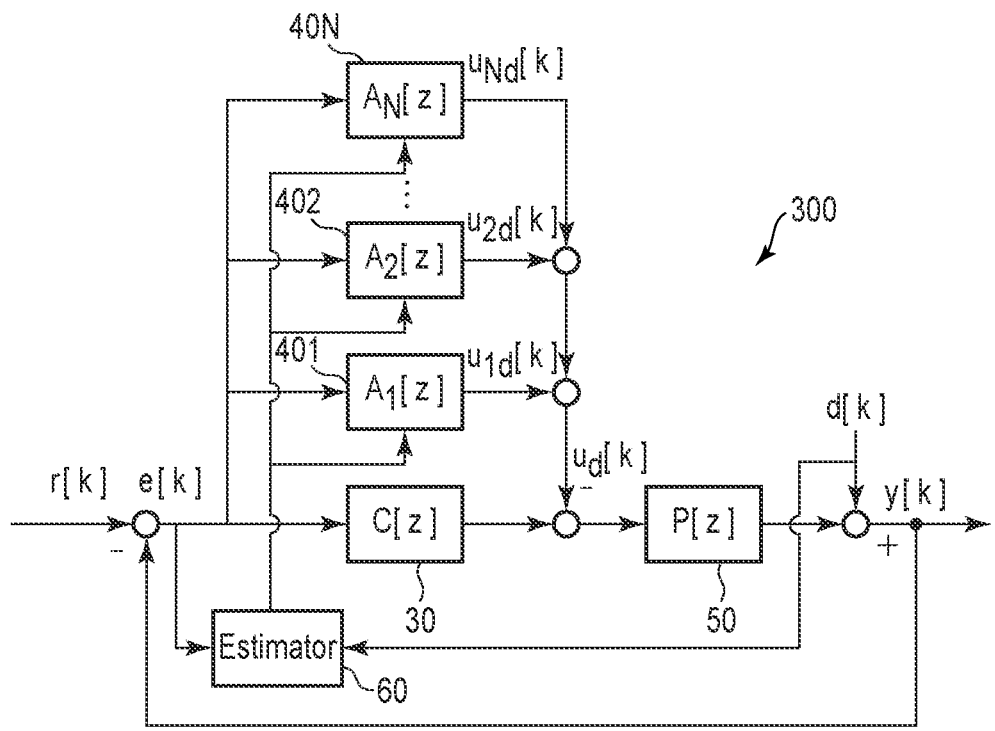
FIG. 8 is an illustration showing an example of a control system which suppresses disturbances according to the embodiment.

FIG. 8 is an illustration showing an example of a control system 300 in which an estimator 60 is added to the control system 200 comprising the stages of filter using the technology of FIG. 3. The estimator 60 estimates the suppression target angular frequency ωi from a position error e[k] and the disturbance d[k]. In addition, the estimator 60 inputs the estimated suppression target angular frequency ωi to each of the filters A1[z] 401 to AN[z] 40N. In the present embodiment, the estimator 60 estimates the suppression target angular frequency ωi from the position error e[k] and the disturbance d[k]. However, the present invention is not limited to this. For example, a rotational vibration sensor may be disposed in the magnetic disk device 1 so that the rotation of the magnetic disk device 1 can be detected, and the suppressing target angular frequency ωi may be determined based on the detected rotation value.

Figure 9:
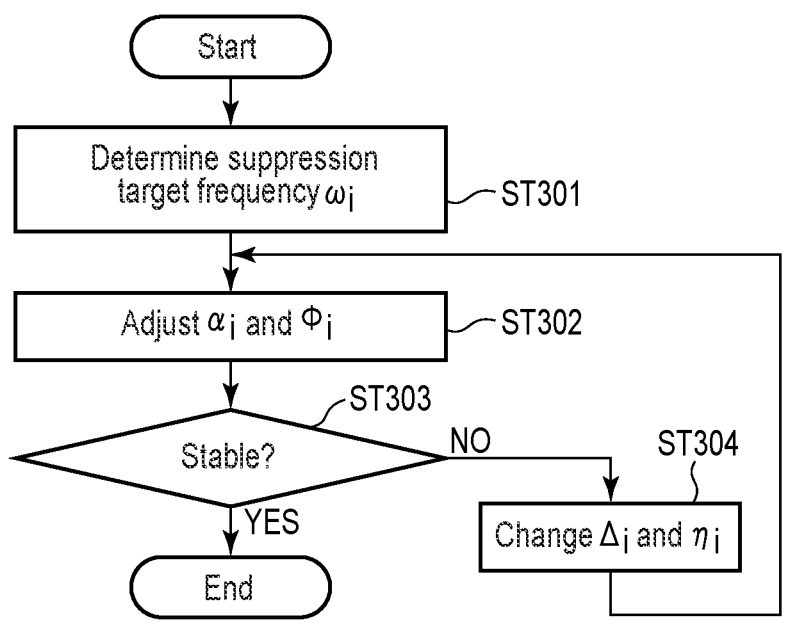
FIG. 9 is a flowchart showing an example of the main flow of a filter coefficient setting process based on an estimated suppression target angular frequency o according to the embodiment.
Figure 10:
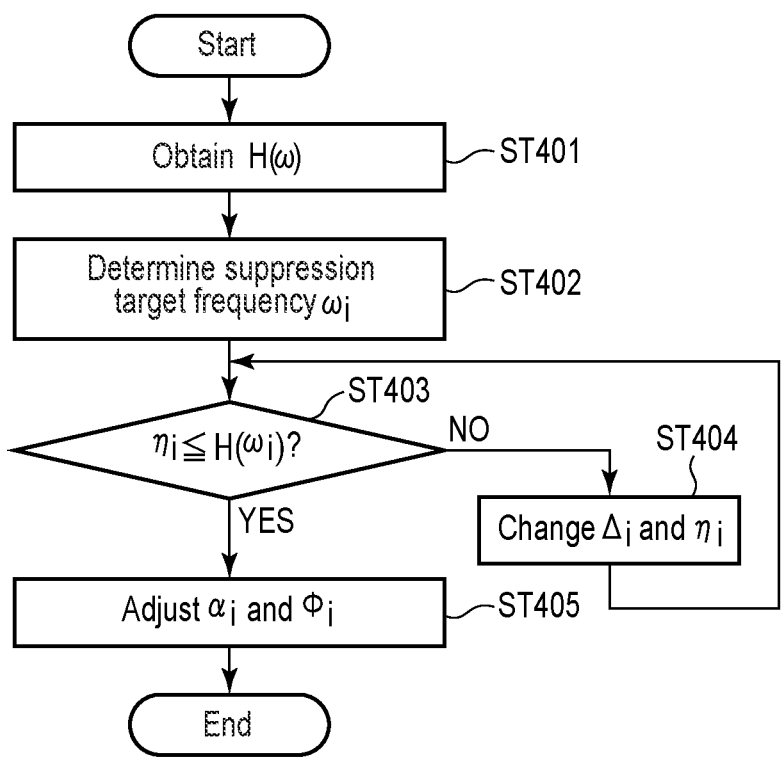
FIG. 10 is a flowchart showing an example of a modification of FIG. 9.

The value of the sensitivity function gain at each suppression target angular frequency ωi is stored in a predetermined storage beforehand. The suppression target angular frequency ωi is obtained from the position error e[k], the disturbance d[k] or both the position error e[k] and the disturbance d[k]. When the suppression target angular frequency ωi is changed, αi and φi also need to be changed. Therefore, after the suppression target angular frequency ωi is determined, αi and φi are adjusted as in the above-described embodiments At this time, the estimator 60 executes adjustment such that the gain at the suppression target angular frequency ωi of each of the filters A1[z] 401 to AN[z] 40N becomes the same between before and after the change or becomes the same as the sensitivity function at the suppression target angular frequency ωi stored beforehand. FIG. 9 is a flowchart showing an example of the main flow of the process of setting the coefficients of each of the filters A1[z] 401 to An[z] 40N based on the estimated suppression target angular frequency ωi. This process is executed by the estimator 60 in the present embodiment. In addition, FIG. 10 is a flowchart showing a modification example of the process of FIG. 9.

First, Ai[z] and Bi[z] are expressed in a format for specifying parameters as the following formulas (15).

$$A_i[z, x_i] := \frac{\mu_i}{\alpha_i} \frac{z^2 \cos\phi_i - \eta_i z \cos(\omega_i T + \phi_i)}{z^2 - 2\eta_i z \cos\omega_i T + \eta_i^2},$$

$$B[z, x] := \sum_{i=1}^{N} A_i[z, x_i]$$

$$x := [\alpha_1 \cdots \alpha_N \; \phi_1 \cdots \phi_N]^T, \; x_i := \begin{bmatrix} \alpha_i \\ \phi_i \end{bmatrix}$$

(15)

As in the following formula (16), the difference between the sensitivity function at a suppression target frequency tilde fi before the change and the sensitivity function at a suppression target frequency fi after the change is set as an objective function.

$$h(x) := \sum_{i=1}^{N} |P[\tilde{f}_i] \; (C[\tilde{f}_i] + B[\tilde{f}_i, \tilde{x}]) + \Delta_i - P[f_i] \; (C[f_i] + B[f_i, x])|$$

(16)

where tilde x is a parameter before the suppression target frequency change, and Δj is a term corresponding to a target sensitivity function gain change indicating either stable or unstable which will be described later. The suppression target angular frequency ωi is determined in this way (ST301).

Then, parameters αi and φi are adjusted (ST302). More specifically, the estimator 60 obtains parameters αi and φi which minimize the above formula (16). For example, the parameters are updated until |x[k+1]−x[k]|<δ is satisfied in the following formula (17).

$$x[k+1] = x[k] - \gamma \nabla h(x[k])$$

(17)

When the suppression target angular frequency changes under the effect of the disturbance, etc., the control system 300 may become unstable. Therefore, the estimator 60 determines whether it is stable or not (ST303). Here, whether it is stable or not is determined based on an index indicating stable/unstable (for example, the integral value of the sensitivity function, the cumulative sum, or the range of the parameter for each suppression target angular frequency obtained beforehand). When the estimator 60 determines that it is not stable, that is, it is unstable (ST303, NO), the estimator 60 changes Δi and ηi (S1304). More specifically, the estimator 60 increases the sensitivity function gain of a suppression target angular frequency and changes parameters such that the index decreases. Here, the parameters are the coefficients of: each of the filters A1[z] 401 to AN[z] 40N, and the sensitivity function gain at the suppression target angular frequency ωi before the change. When the estimator 60 determines that it is not stable as described above, the estimator 60 executes adjustment by changing the target sensitivity function gain during adjustment (Δi of the above formula (16) and ηi until the control system 300 becomes stable.

It should be noted that, as shown in FIG. 10, an upper limit H(ω) of η may be obtained beforehand (ST401), ηi<H(2πfi) may be checked and the suppression target angular frequency ωi may be determined (ST402), and based on the determination of whether ηi≤H(ωi) or not (ST403), Δi and ηi may be changed (ST404), and the parameters αi and φi may be adjusted (ST405).

In the present embodiment, also when the suppression target angular frequency ωi changes according to the environment, the magnetic disk device 1 can set appropriate coefficients to each of the loop shaping filters A1[z] 401 to AN[z] 40N using the estimated suppression target angular frequency ωi. Accordingly, the magnetic disk device 1 can improve the positioning accuracy of the magnetic head 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a controlled object;
    a controller which controls a motion of the controlled object;
    an estimator for estimating a plurality of angular frequencies to be suppressed caused by disturbance acting on the controlled object; and
    a plurality of loop shaping filters provided corresponding to each of the plurality of angular frequencies, each connected in parallel to the controller, each set with coefficients for suppressing the corresponding angular frequency, wherein
    the coefficients set for each of the plurality of loop shaping filters are obtained as follows:
        providing a plurality of first design parameters corresponding to each of the plurality of loop shaping filters,
        the plurality of first design parameters are such that a first variable of gain or gain and phase of a first sensitivity function at a corresponding angular frequency when each of the plurality of loop shaping filters is independently enabled is each designed to meet a variable target of gain target or gain target and phase target,
        obtaining a plurality of second design parameters corresponding to each of the plurality of the first design parameters,
        the second design parameters are obtained by updating a part of the first design parameters,
        the part of the first design parameters are parameters relating to a transfer function from the output of the corresponding loop shaping filter to before the input of the disturbance acting on the controlled object,
        the part of the first design parameters are such that a second variable of gain or gain and phase of a second sensitivity function at the angular frequency when all of the plurality of loop shaping filters are enabled is updated to be the same as the first variable of gain or gain and phase of the first sensitivity function, and coefficients to be set in corresponding loop shaping filters are calculated and acquired from the plurality of second design parameters.

2. The magnetic disk device of claim 1, wherein the parameter of the transfer function from the output of the corresponding loop shaping filter to before the input of the disturbance acting on the controlled object uses an approximation of the amount of change when only the corresponding loop shaping filter is enabled and all of the plurality of loop shaping filters are enabled, and the second design parameters are obtained by updating the transfer function parameters for which the approximation was used.

3. The magnetic disk device of claim 1, wherein each of the second design parameters are obtained by updating such that the difference between the first variable of the first sensitivity function and the second variable of the second sensitivity function is minimized.

4. The magnetic disk device of claim 1, wherein the controlled object is a voice coil motor.

5. The magnetic disk device of claim 1, wherein the controlled object is a microactuator.

6. The magnetic disk device of claim 1, wherein the controlled object is a voice coil motor and a microactuator.

7. The magnetic disk device of claim 1, wherein when at least one of the angular frequencies estimated by the estimator changes from a time the first design parameters are designed, and the second design parameters are determined such that the second variable of the second sensitivity function after the change and the previous first variable of the first sensitivity function before the change are the same.

8. The magnetic disk device of claim 1, wherein when at least one of the angular frequencies estimated by the estimator changes from a time the first design parameters are designed, and the second variable of the second sensitivity function at the angular frequency is determined to be the same as the first variable of the first sensitivity function at the angular frequency before the change, if a control system comprising the controlled object, the controller and the loop shaping filters does not become stable, the second design parameters are re-determined such that a third variable obtained by increasing the first variable of the first sensitivity function and the second variable of the second sensitivity function are the same.

9. The magnetic disk device of claim 1, wherein an integrated value and cumulative value of the second variable of the second sensitivity function are used to determine whether a control system comprising the controlled object, the controller and the loop shaping filters is stable.

10. A suppression method for suppressing angular frequencies caused by a disturbance acting on a controlled object when the operation of the controlled object of a magnetic disk drive is controlled by a controller, the method comprising:

estimating a plurality of angular frequencies to be suppressed caused by disturbance acting on the controlled object; and connecting a plurality of loop shaping filters provided corresponding to each of the plurality of angular frequencies in parallel to the controller, that each of the plurality of loop shaping filters has a frequency characteristic that suppresses the corresponding angular frequency to be suppressed, wherein coefficients set for each of the plurality of loop shaping filters are obtained as follows:

providing a plurality of first design parameters corresponding to each of the plurality of loop shaping filters, the plurality of first design parameters are such that a first variable of gain or gain and phase of a first sensitivity function at a corresponding angular frequency when each of the plurality of loop shaping filters is independently enabled is each designed to meet a variable target of gain target or gain target and phase target, obtaining a plurality of second design parameters corresponding to each of the plurality of the first design parameters, the second design parameters are obtained by updating a part of the first design parameters, the part of the first design parameters are parameters relating to a transfer function from the output of the corresponding loop shaping filter to before the input of the disturbance acting on the controlled object, the part of the first design parameters are such that a second variable of gain or gain and phase of a second sensitivity function at the angular frequency when all of the plurality of loop shaping filters are enabled is updated to be the same as the first variable of gain or gain and phase of the first sensitivity function, and coefficients to be set in corresponding loop shaping filters are calculated and acquired from the plurality of second design parameters.

* * * * *